Figure 3:
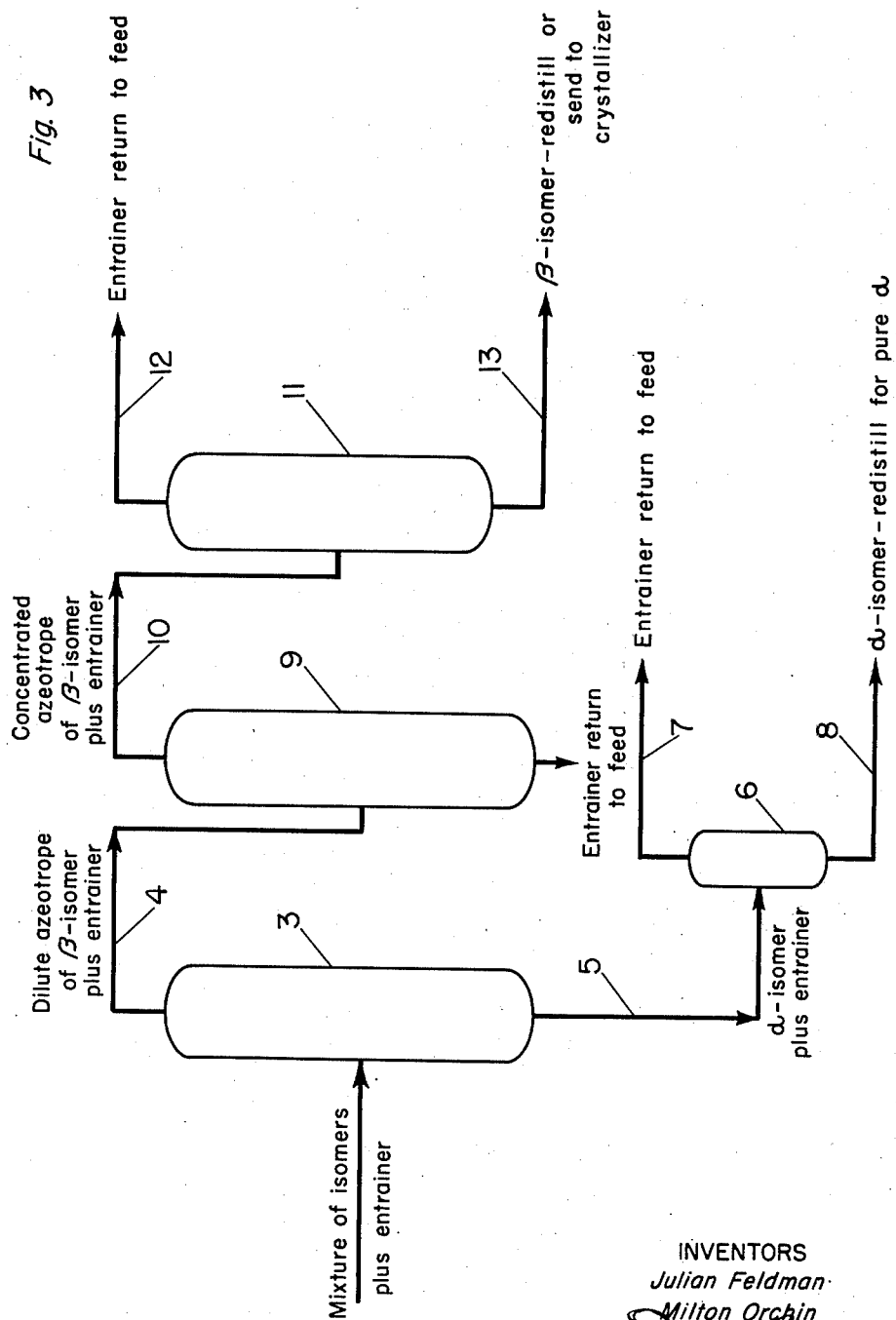

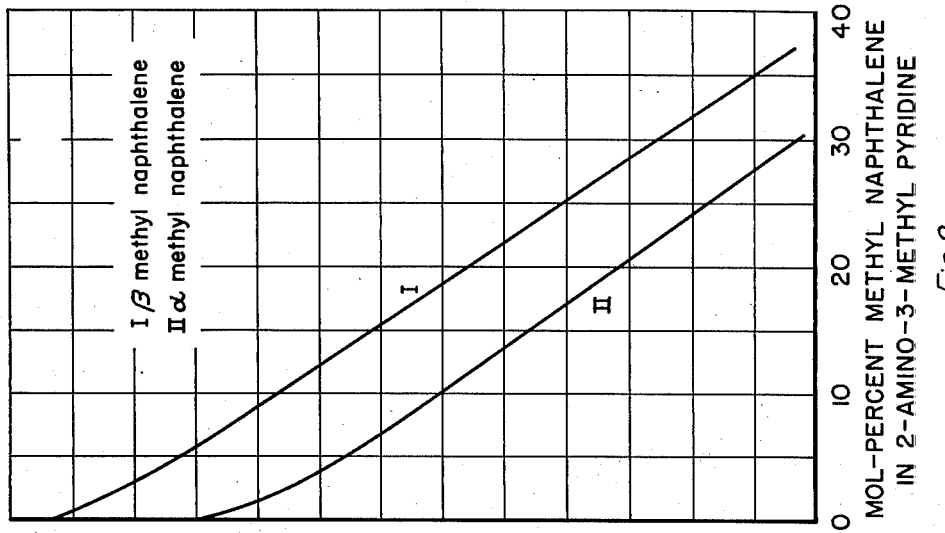
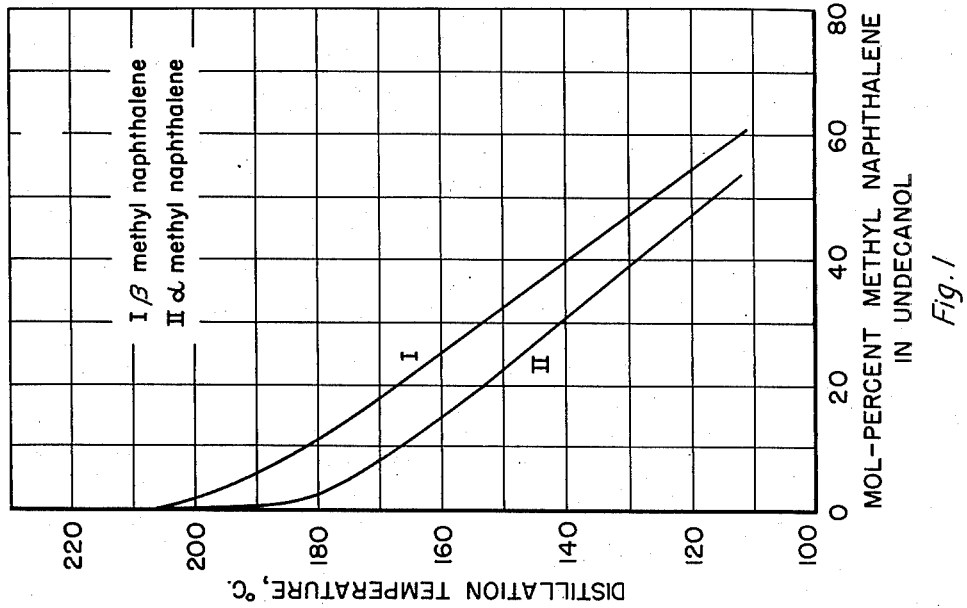
INVENTORS
Julian Feldman
Milton Orchin
BY
ATTORNEY

Jan. 29, 1952          J. FELDMAN ET AL          2,583,554
     METHOD FOR THE SEPARATION OF α-METHYL NAPHTHALENE FROM β-METHYL
                 NAPHTHALENE BY AZEOTROPIC DISTILLATION
Filed Feb. 9, 1950                                 2 SHEETS—SHEET 2

INVENTORS
Julian Feldman
Milton Orchin
BY
ATTORNEY

Patented Jan. 29, 1952

2,583,554

UNITED STATES PATENT OFFICE 2,583,554

METHOD FOR THE SEPARATION OF α-METHYL NAPHTHALENE FROM β-METHYL NAPHTHALENE BY AZEOTROPIC DISTILLATION

Julian Feldman and Milton Orchin, Pittsburgh, Pa., assignors to the United States of America as represented by the Secretary of the Interior Application February 9, 1950, Serial No. 143,288

5 Claims. (Cl. 202—42)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to a method for separating difficultly separable isomeric organic compounds and is particularly concerned with a method for separating α-methyl naphthalene from β-methyl naphthalene by a process involving azeotropic distillation.

Since isomeric compounds have the same molecular weight, virtually the same chemical structure, and usually have boiling points which are only a few degrees apart, the separation of isomers from one another is usually a difficult matter. Direct fractional distillation of the isomer mixture, and conventional methods of azeotropic distillation usually are impractical. In the case of polynuclear isomers, the difficulties of separation are particularly aggravated, especially since they usually form mixed crystals and thus cannot be easily separated by recrystallization. An example of such difficultly separable polynuclear isomers with which this invention is particularly concerned is the isomeric pair α-methyl naphthalene and β-methyl naphthalene.

The problem of separating α-methyl naphthalene from β-methyl naphthalene has been quite thoroughly studied by a number of investigators. See for example, "Separation of the Aromatic Hydrocarbons and the Isolation of n-Dodecane, Naphthalene, 1-Methyl Naphthalene, and 2-Methyl Naphthalene from the Kerosene Fraction of Petroleum" by Mair and Streiff, Research Paper R. P. 1289, National Bureau of Standards, J. of Research, vol. 24, 1940; and the articles by E. A. Coulson, appearing in the J. of the Society of Chemical Industry: "Preparation of α- and β-Methyl Naphthalene from Tar Oil Fractions," vol. 60, pp. 123 to 126 (1941); vol. 62, pp. 177 to 179 (1943).

α- and β-methyl naphthalene occur naturally in petroleum and coal-tar oils and are inevitably found in admixture with one another. The isomers boil only a few degrees apart, the α-isomer boiling at 244.8° C. and the β-isomer boiling at 241.1° C. at 760 mm. Hg. In addition to this proximity of boiling points, the separation of these isomers is made more difficult by the fact that recrystallization alone cannot be used since the isomers form a eutectic consisting of about 82% of the α-isomer. By very careful fractionation in very efficient distillation equipment followed by recrystallization at low temperature, it is possible to obtain pure α-methyl naphthalene but the procedures involved are tedious and expensive. The β-isomer is somewhat easier to obtain in a pure state. Since both isomers in their pure state have important uses as intermediates, and since a mixture of these isomers may be obtained in commercial quantities in coal-tar oils, it is of importance to provide a method for the separation of these isomers which is less tedious and more economical.

In accordance with the present invention, a technique of azeotropic distillation has been evolved which may be applied to the separation of difficultly separable organic isomers, particularly the polynuclears, and which has proven to be especially effective in the separation of α-methyl naphthalene from β-methyl naphthalene. It has been found that the separation of α-methyl naphthalene from β-methyl naphthalene may be economically achieved by distilling a mixture containing these isomers in the presence of an entrainer which at a selected pressure forms a dilute, low-boiling azeotrope with one of the isomers and virtually no azeotrope with the other isomer. The low-boiling azeotrope of entrainer with one of the isomers may be distilled from the mixture, leaving excess entrainer and the other isomer in the still residue.

As entrainers for carrying out this process, a commercial undecanol having the formula 5-ethyl nonanol-2 and a boiling point of 225° C. at 760 mm. Hg, and the compound 2-amino-3-methyl pyridine having a boiling point of 221° C. at 760 mm. Hg, have proven to be particularly suitable. For convenience, 5-ethyl nonanol-2 will be hereinafter referred to as undecanol. Other entrainers than these may be used, however, which, at a selected pressure, have the property of forming a dilute azeotrope with one of the isomers but virtually no azeotrope with the other.

As a further important feature of the invention, it has been found that after the initial separation of the isomers, the entrainer itself may be removed from admixture with the isomers by one or more distillations at pressures different from that employed in the original distillation.

More particularly, it has been found that the separation of α- from β-methyl naphthalene may be achieved by adding to a mixture containing these isomers an entrainer selected from the group consisting of undecanol and 2-amino-3-methyl pyridine, distilling this mixture at a subatmospheric pressure selected so that the entrainer will form a dilute azeotrope with β-methyl naphthalene and virtually no azeotrope with α-methyl naphthalene. The entrainer β-methyl naphthalene azeotrope formed at the selected pressure boils appreciably below the boiling point of α-methyl naphthalene and may be fractionally distilled therefrom with comparative ease. The distillation of the azeotrope may be continued until all of the β-methyl naphthalene has been removed as overhead distillate, leaving only α-methyl naphthalene and excess entrainer in the still residue.

In order that the invention might be better understood reference is now made to the drawings in which Figure 1 is a graph showing the variation in composition of azeotropes of α- and β-methyl naphthalene with undecanol at varying distillation temperatures corresponding to varying distillation pressures;

Figure 2 is a graph showing the variation in composition of azeotropes of α- and β-methyl naphthalene with 2-amino-3-methyl pyridine at varying distillation temperatures corresponding to varying distillation pressures and, Figure 3 is a schematic outline of a continuous process for the separation of α- and β-methyl naphthalene according to the method of the invention.

Referring now to Figure 1, this graph illustrates the azeotropic behavior of each of the isomers α- and β-methyl naphthalene with undecanol (5-ethyl nonanol-2) as the distillation pressure changes. Curve 1 shows the behavior of β-methyl naphthalene-undecanol azeotropes while Curve 2 shows the behavior of α-methyl naphthalene-undecanol azeotropes. Each curve was determined separately by distilling a sample of the pure isomer in an excess of undecanol at varying distillation pressures. At each particular pressure a small sample of distillate was collected at a high reflux ratio and analyzed. Results of this procedure for both isomers is set forth in Table I below.

Table I

| α=isomer in undecanol | | | β=isomer in undecanol | | |
|---|---|---|---|---|---|
| Distillation Pressure | Distillation Temp.,°C. | Per cent α in Distillate | Distillation Pressure | Distillation Temp.,°C | Per cent β in Distillate |
| 760 | 225 | 0 | 760 | 225 | 0 |
| 400 | 225 | 0 | 400 | 203 | 0.6 |
| 300 | 193 | 0.6 | 300 | 193.5 | 4.1 |
| 275 | 191 | 0.7 | 250 | 188 | 6.3 |
| 250 | 188.5 | 0.8 | 200 | 181.5 | 8.7 |
| 240 | 186.5 | 0.8 | 150 | 172.5 | 16.3 |
| 220 | 184 | ---- | 90 | 157 | 28.0 |
| 200 | 179.5 | 2.4 | 50 | 140.5 | 40.3 |
| 175 | 176 | 4.9 | 20 | 120 | 54.4 |
| 150 | 173 | 6.2 | | | |
| 90 | 157.5 | 17.0 | | | |
| 50 | 143 | 28.8 | | | |
| 19 | 121 | 45.9 | | | |

For every distillation pressure there is, of course, a corresponding distillation temperature and, for convenience, the composition of the distillate has been plotted against the distillation temperature rather than the pressure. It will be noted that at atmospheric pressure, or 760 mm. Hg, the distillation temperature in the case of both isomers (see Table I) is 225° C. corresponding to the boiling point of undecanol, indicating that at this pressure undecanol does not form an azeotrope with either of the isomers. At 400 mm. Hg corresponding to a distillation temperature of 203° C., β-methyl naphthalene begins to form a very dilute azeotrope with undecanol. It will be noted that as the distillation pressure decreases below 400 mm. the mole per cent of β-methyl naphthalene in the azeotrope increases until at about 20 mm. Hg an azeotrope containing over 50% β-methyl naphthalene is obtained. In the case of α-methyl naphthalene, however, virtually no azeotrope is formed until the distillation pressure is decreased to about 200 mm. Hg corresponding to distillation temperature of about 180° C. With further decreases in pressure the concentration of α-methyl naphthalene in the undecanol azeotrope also increases until at 20 mm. Hg, corresponding to a distillation temperature of 120° C., an azeotrope containing about 46% α-methyl naphthalene is obtained.

Where both α- and β-methyl naphthalene form azeotropes with undecanol it will be noted that the boiling points of these azeotropes at any given distillation pressure are very close (see Table I). Thus, if a mixture of undecanol and α- and β-methyl naphthalene is distilled at a pressure at which the azeotropes of both isomers were formed, both azeotropes will distill off together, since their boiling points are so close it would virtually be impossible to separate them by fractional distillation. It can be seen however, that there is a constant difference of about 6 to 8% in the composition of the azeotropes at any given distillation pressure. In the range of distillation pressures where the azeotropes are rich in the methyl naphthalene isomers, this difference in composition is of little significance. However, as the azeotropes become more dilute, the ratio of the β-isomer to the α-isomer in the distillate becomes increasingly larger. For example, at 20 mm. Hg, corresponding to a distillation temperature of about 120° C., azeotropes are formed rich in both α- and β-methyl naphthalene, and the distillate contains the β- and α-isomers in the ratio of about 1.2 to 1. At 90 mm. Hg, corresponding to a distillation temperature of about 157° C., the ratio of β-isomer to α-isomer in the distillate has increased to about 1.7 to 1. Finally, at about 250 mm. Hg an azeotrope containing about 6.3% of β-methyl naphthalene and less than 1% of α-methyl naphthalene is formed so that the ratio of β- to α-methyl naphthalene in the distillate is now about 8 to 1.

The hydrocarbon-undecanol azeotropes formed at any given pressure boil appreciably below the boiling temperatures of the pure isomers at that pressure. Thus, by distilling a mixture of the isomers in the presence of undecanol at a pressure at which undecanol forms a dilute azeotrope with β-methyl naphthalene but virtually no azeotrope with α-methyl naphthalene, a distillate will be obtained many times richer in the β-isomer while the still residue rapidly becomes relatively richer in the α-isomer. By using a large amount of undecanol, this process may be continued until all of the β-methyl naphthalene has been removed as overhead distillate, leaving only α-methyl naphthalene and excess entrainer in the still residue. Small amounts of the α-isomer will usually distill over the β-isomer, but the ratio of β to α in the distillate will be high.

It is, of course, possible to effect a separation of the isomers by distilling the mixture of isomers with undecanol in a range of pressures where an azeotrope of the α-isomer with undecanol is formed containing an appreciable amount of the α-isomer. For example, at a distillation pressure of about 130 mm. Hg corresponding approximately to a distillation temperature of 167° C., the distillate will contain about 10% of the α-isomer and 20% of the β-isomer thus removing the β-isomer from the still twice as fast as the α-isomer. As can readily be seen however, separation is not as efficiently achieved in this manner, since the overhead distillate contains a large amount of the α-isomer.

From an inspection of Figure 1 it can be seen that as the distillation pressure approaches that at which there is no azeotrope formed between undecanol and β-methyl naphthalene, the β-methyl naphthalene undecanol azeotrope becomes progressively more dilute until at about 400 mm. Hg an azeotrope containing only about 0.6% of β-methyl naphthalene is obtained. For economic reasons it is preferred not to operate in the range of pressures corresponding to extremely dilute β-methyl naphthalene undecanol azeotropes, since this would require the evaporation of excessive amounts of undecanol in order to achieve the removal of appreciable amounts of the β-isomer. Preferably, the distillation pressure is selected so that the entrainer forms an azeotrope containing as large as possible a percentage of the β-isomer, while at the same time virtually no azeotrope of the α-isomer with entrainer is formed. In the case of undecanol, the preferred range of distillation pressures, based on these considerations, is from about 200 to 300 mm. Hg.

Referring now to Figure 2, this graph illustrates the azeotropic behavior of each of the isomers α- and β-methyl naphthalene with 2-amino-3-methyl pyridine as the distillation pressure changes. Curve 1 shows the behavior of β-methyl naphthalene 2-amino-3-methyl pyridine azeotropes while curve 2 shows the behavior of α-methyl naphthalene 2-amino-3-methyl pyridine azeotropes. These curves were determined in the same manner as the curves in Figure 1 by distilling a sample of the pure isomer in an excess of 2-amino-3-methyl pyridine at varying distillation pressures, collecting a sample of distillate at a high reflux ratio and analyzing the distillate for the α- or β-isomer. Results of this procedure for both isomers is set forth in Table II below.

*Table II*

| α-isomer in 2-amino-3-methyl pyridine | | | β-isomer in 2-amino-3-methyl pyridine | | |
| --- | --- | --- | --- | --- | --- |
| Distillation Pressure | Distillation Temp. °C. | Per cent α in Distillate | Distillation Pressure | Distillation Temp. °C. | Per cent β in Distillate |
| 760 | 221 | 0 | 760 | 221 | 0. |
| 400 | 198 | 1.0 | 550 | 209 | 3.0 |
| 325 | 190 | 2.0 | 400 | 196 | 6.3 |
| 290 | 187 | 2.8 | 250 | 182 | 11 |
| 250 | 177–181 | 3.3 | 150 | 165 | 18.6 |
| 150 | 166 | 8.1 | 90 | 151 | 23.0 |
| 90 | 159 | 10.0 | 50 | 137 | 25.0 |
| 50 | 136 | 19.9 | 21 | 116 | 28 |
| 20 | 115 | 26.2 | 20 | 115 | 33 |
|  |  |  | 19 | 114 | 31 |
|  |  |  | 16 | 109 | 36 |

As in Figure 1, the distillation temperature rather than the pressure has been plotted against the composition of the distillate. The behavior of the isomers in the presence of 2-amino-3-methyl pyridine is substantially the same as their behavior in the presence of the undecanol entrainer. At atmospheric pressure neither of the isomers form an azeotrope with 2-amino-3-methyl pyridine. At about 550 mm. Hg corresponding to a distillation temperature of about 209° C. the β-isomer first begins to form an azeotrope with 2-amino-3-methyl pyridine, the concentration of the β-isomer in the azeotrope increasing as the pressure decreases. The α-isomer, on the other hand, forms virtually no azeotrope until a distillation pressure of 400 mm. Hg (corresponding to a distillation temperature of about 198° C.) is reached. With decreasing pressure the concentration of the α-isomer in the azeotrope with 2-amino-3-methyl pyridine also increases, there always being, however, a constant difference of about 8% in the composition of the α-isomer azeotrope and the β-isomer azeotrope.

As is the case with undecanol, the azeotropes of the isomers with 2-amino-3-methyl pyridine likewise boil close together, and the only effective way to separate the isomers is to distill them in the presence of the entrainer at a pressure selected so that the entrainer forms a dilute azeotrope with the β-isomer and virtually no azeotrope with the α-isomer. As in the case of undecanol, it is preferred not to operate in the range of pressures corresponding to extremely dilute β-methyl naphthalene 2-amino-3-methyl pyridine azeotropes since this would require the evaporation of excessive amounts of entrainer. Using 2-amino-3-methyl pyridine as the entrainer it is preferred to operate in the range of from about 250 to 550 mm. Hg, since within this range the ratio of β- to α-methyl naphthalene in the distillate is high, while extremely dilute azeotropes of β-methyl naphthalene with entrainer are avoided.

It is desired to emphasize the fact that the method of the invention does not consist in the use of an entrainer which will form an azeotrope with one isomer which at any given pressure, boils at a significantly different temperature than the azeotrope formed with the other isomer under the same conditions. α- and β-methyl naphthalene, and many other isomers, are so structurally similar that the azeotropes which are formed with any given entrainer boil too close together to allow separation of the azeotropes by fractional distillation. This is illustrated for example by the azeotropes which α- and β-methyl naphthalene form with undecanol and 2-amino-3-methyl pyridine. (See Tables I and II.) In the process of the invention, no attempt is made to fractionate the azeotropes formed with any given entrainer, but rather an entrainer is chosen which will form azeotropes with the isomers, the composition of the azeotropes varying with pressure in such a manner that within a selected range of pressures the entrainer will form a dilute azeotrope with one of the isomers and virtually no azeotrope with the other. In distilling the mixture of entrainer and isomers in the selected pressure range, both isomers may form azeotropes to some extent with the entrainer, but one of these azeotropes will be so dilute that it is fair to say that virtually no azeotrope of this isomer is formed.

In general, an azeotroping agent (that is, an entrainer) which will be effective in the process of the invention should have the following characteristics:

1. It should have a boiling point from 10 to 50° C. lower than the boiling point of the isomers to be separated.

2. It should be soluble in the isomers to be separated to avoid the formation of two liquid phases.

3. In admixture with the isomers to be separated it should form a solution which shows a substantial deviation from Raoult's Law of Ideal Solutions. In the case of predominantly hydrocarbon isomers such as α- and β-methyl naphthalene, the most effective azeotroping agents are those containing OH or NH groups.

4. It is also essential that the distillation temperature at which the entrainer will form a dilute azeotrope with one of the isomers and virtually, no azeotrope with the other should be below the decomposition temperature of the isomers to be separated or that of the entrainer. The decomposition temperature of α- and β-methyl naphthalene is in the neighborhood of 400° C.

In order to effect a complete separation of the isomers according to the method of the invention, it will, in general, be necessary to use a large excess of entrainer since the overhead distillate will contain a large proportion, usually over 90%, of entrainer. For example, when distilling a mixture of α- and β-methyl naphthalene in the presence of undecanol under preferred conditions, the overhead distillate will contain approximately 95% undecanol and 5% β-methyl naphthalene. However, the amount of entrainer employed is not critical. So long as there is enough entrainer present to form a dilute azeotrope with one of the isomers at the selected pressure, separation according to the process of the invention will continue. All of the entrainer need not be added initially, but may be continuously or periodically added as distillation proceeds.

An important feature of the invention resides in the method by which the entrainer may be recovered from admixture with the separate isomers following the original distillation in which the isomers are separated from one another. In general, this is accomplished by distilling the mixture of isomer and entrainer at a pressure different from that employed in the original distillation, taking advantage of the fact that the composition of the azeotropes which the entrainer forms with each of the isomers varies with distillation pressure and that at some pressure no azeotrope will form at all.

For example, in the case of the separation of β- and α-methyl naphthalene using an entrainer comprising undecanol or 2-amino-3-methyl pyridine, the β-isomer will be recovered as a dilute solution in the entrainer. As one alternative, this dilute solution could be distilled at atmospheric pressure at which no azeotrope is formed between the entrainer and the β-isomer. However, since the entrainer boils at a lower temperature than the β-isomer, this would require the distillation of very large amounts of entrainer to achieve the separation. Preferably, the dilute solution of β-isomer in the entrainer is redistilled at a pressure lower than that used in the original distillation in order that an azeotrope may be formed rich in the β-isomer. In this way, the relatively small amount of β-isomer in the mixture is rapidly removed as overhead distillate. Substantially pure undecanol is recovered as still residue and may be returned to make up fresh feed for the original distillation. The fairly concentrated solution of β-isomer in entrainer recovered as overhead from this redistillation is again distilled at a pressure higher than that used in the original distillation whereby no azeotrope is formed, and the more volatile entrainer stripped away, leaving the β-isomer as bottoms. In the case of the separation of α- from β-methyl naphthalene using an undecanol entrainer, the redistillation of the dilute β-isomer-undecanol solution recovered as overhead from the original distillation is preferably conducted at a pressure below 90 mm. Hg. The concentrated β-isomer-undecanol solution recovered as overhead distillate from this redistillation is then distilled at a pressure over 400 mm. Hg, most conveniently atmospheric, so that no azeotrope is formed between the β-isomer and undecanol. The undecanol (boiling about 15° C. below the boiling temperature of β-methyl naphthalene at 760 mm. Hg) is stripped away leaving the β-isomer in the still.

Using 2-amino-3-methyl pyridine as the entrainer in the separation of α- from β-methyl naphthalene, the redistillation of the dilute β-isomer 2-amino-3-methyl pyridine solution from the original distillation is preferably conducted at a pressure below 150 mm. Hg. The concentrated β-isomer 2-amino-3-methyl pyridine solution recovered from this redistillation is then distilled at a pressure above 700 mm. Hg, most conveniently atmospheric pressure. The 2-amino-3-methyl pyridine (boiling about 20° below the boiling temperature of β-methyl naphthalene at 760 mm. Hg) is stripped away leaving the β-the β-isomer in the still.

The same procedure as was used to separate the mixture of the β-isomer from the entrainer may be used to recover the α-isomer. If a dilute solution of the α-isomer in the entrainer is recovered from the original distillation, the solution may first be concentrated by distilling at a pressure lower than that used in the original distillation in order to distill off an azeotrope rich in the α-isomer. Usually, however, the α-isomer will be recovered from the original distillation as a fairly concentrated solution in the entrainer since most of the entrainer is removed as an overhead distillate as an azeotrope with the β-isomer. Thus, the α-isomer can usually be separated from the entrainer by a single fractional distillation at a pressure greater than that used in the original distillation. In the case of undecanol and 2-amino-3-methyl pyridine entrainers, this straight fractional distillation is most conveniently carried out at atmospheric pressure where the entrainer boils at a temperature from 15 to 20° below the boiling point of the α-isomer.

If desired, other means than distillation may be employed to separate the isomers from the entrainer. For example, methods such as solvent extraction and chemical precipitation may be employed in appropriate cases. For example, in the case of 2-amino-3-methyl pyridine, extraction with aqueous HCl or sulfuric acid, for example, may be used. The amine salt can be recovered by evaporation to give a concentrated solution of the salt from which the free base can be recovered by neutralization. Where the entrainer is stable under the distillation conditions necessary to effect separation, recovery of the entrainer from admixture with the isomers is preferably effected by the distillation technique set out above.

Reference is now made to Figure 3 which schematically illustrates a continuous process for the separation of α-methyl naphthalene from β-methyl naphthalene according to the method of the invention. A mixture of the isomers to which has been added a large excess of entrainer is continuously fed to distilling column 3 which is operated at a pressure selected so that the entrainer will form a dilute azeotrope with β-isomer but virtually no azeotrope with the α-isomer. In the case of undecanol and 2-amino-3-methyl pyridine entrainer this column is operated at a subatmospheric pressure. Column 3 is equipped with a sufficient number of theoretical plates so that the dilute low-boiling azeotrope of the entrainer with the β-isomer is continuously removed as an overhead fraction by line 4 and the higher boiling materials comprising a non-azeotropic mixture of α-methyl naphthalene and entrainer collect at the bottom. By properly adjusting the conditions in the column according to methods well known in the art, the residue collecting at the bottom is obtained virtually free of the β-isomer and comprises a relatively concentrated solution of the α-isomer in the entrainer, since most of the entrainer goes off in the overhead as an azeotrope with the β-isomer. This relatively concentrated solution containing the α-isomer is conducted to column 6 by line 5 and redistilled at a pressure different from that used in the original distillation, remote from the pressure at which azeotropes of the α-isomer with the entrainer are inclined to form. In the case of undecanol and 2-amino-3-methyl pyridine entrainers, this second distillation is most conveniently conducted at atmospheric pressure. From this second distillation, the entrainer is removed as overhead distillate by line 7 and may be returned to make up new feed for column 3. The α-isomer is removed from the bottom of column 6 by line 8 and may be further purified by conventional methods. Further purification, however, is not usually necessary since purities up to 99% of the α-isomer may be obtained at this point.

The overhead distillate from column 3, which comprises a dilute solution of the β-isomer in the entrainer, which is azeotropic at the pressure prevailing in column 3, is conducted by line 4 to column 9. Column 9 is maintained at a pressure below that prevailing in column 3 in order that the β-isomer form a more concentrated azeotrope with the entrainer. Thus, for example, where the overhead distillate from column 3 contains 5% of the β-isomer, by operating column 9 at a pressure substantially lower than the pressure employed in column 3, the overhead distillate removed from column 9 may comprise an azeotrope of the entrainer with β-isomer containing more than 50% of the β-isomer. In this manner the β-isomer may be removed from the bulk of the entrainer by distilling only a relatively small amount of the dilute solution removed as overhead distillate from column 3. The entrainer, thus stripped of the β-isomer may be removed from the bottom of column 9 and returned to make up additional feed for column 3.

The relatively concentrated solution of the β-isomer in entrainer removed as overhead distillate from column 9, is conducted by line 10 to column 11 operated at a pressure at which the β-isomer forms no azeotrope with the entrainer. In the case of undecanol and 2-amino-3-methyl pyridine entrainers column 11 is most conveniently operated at atmospheric pressure. The entrainer is removed as overhead distillate by line 12 and may be returned to make up more feed for column 3. The β-isomer, substantially free of entrainer is removed as still residue by line 13. The β-isomer will usually be contaminated by small amounts of the α-isomer which distilled off with the β-isomer in the original distillation. Ordinarily, the α-isomer will be present in amounts less than 20% and a high percentage of the β-isomer can be recovered from this mixture by recrystallization. The mother liquors from the recrystallization, relatively depleted in the β-isomer, may be returned to column 3 for recycling. Alternately, the mixture of α- and β-isomer may be distilled in an efficient column and the first fractions, consisting of almost pure β-isomer recovered, while the bottoms are recycled to column 3 to be reprocessed. If only the α-isomer is desired, the entire overhead distillate from column 3 may be returned as feed after removal of the entrainer.

The following examples are intended to illustrate the invention.

Example 1

A charge of about 52 volumes of α-methyl naphthalene, 50 volumes of β-methyl naphthalene and about 300 volumes of undecanol were distilled in a column having about 20 theoretical plates under the prevailing distillation conditions, at a pressure of 260 mm. Hg. During the distillation additional quantities of undecanol, totaling in about 2000 volumes were periodically added. The distillation temperature ranged between 186 to 190° C., or about 10 to 15° below the boiling points of the pure isomers at this pressure. The distillation was continued until substantially all the β-isomer was removed from the still, as indicated by a change in the refractive index of the overhead distillate.

The still residue contained only the α-isomer and undecanol. This mixture was then distilled at atmospheric pressure (736 mm. Hg) in a column having about 20 theoretical plates under the conditions of distillation. The distillation temperature was 225° C. About 30 volumes of the original 52 volumes of the α-isomer was recovered in a purity of over 99% without any further purification.

The overhead distillate from the original distillation, consisting of a solution containing about 94% undecanol, 5% β-methyl naphthalene, and 1% α-methyl naphthalene was distilled at a pressure of about 20 mm. Hg in a column operating at an efficiency of about 20 theoretical plates. The still head temperature was 120° C. A distillate was recovered containing about 50% of undecanol, 40% of the β-isomer, and 10% of the α-isomer. The bulk of the undecanol was recovered substantially pure as still residue. The concentrated solution thus obtained was redistilled at atmospheric pressure and the remaining undecanol stripped off, leaving a mixture containing about 80% of the β-isomer and 20% of the α-isomer. Substantially all of the original 50 volumes of the β-isomer were present in this mixture, and most of the α-isomer not recovered as still residue in the original distillation was present in this mixture.

Example 2

A charge consisting of about 49 volumes of the α-isomer and 42 volumes of the β-isomer and about 400 volumes 2-amino-3-methyl pyridine was distilled in a column operating at an efficiency of 20 theoretical plates, at a pressure of 325 mm. and at a still head temperature of 192° C. This distillation was continued until substantially all the β-isomer was removed from the still residue as indicated by a change in the refractive index of the overhead mixture.

To recover the α-methyl naphthalene, the still residue, consisting of a mixture of this isomer with 2-amino-3-methyl pyridine, was acidified with aqueous hydrochloric acid followed by extraction with benzene to recover the α-isomer from the amine salt. The α-isomer was recovered in the purity over 97%.

The overhead distillate from the original distillation, consisting of a solution containing about 90% 2-amino-3-methyl pyridine, 8% of the β-isomer, and 2% of the α-isomer, was treated in a manner similar to that described in Example 1.

The dilute solution was first concentrated by distillation at a low pressure, and the concentrated solution thus obtained redistilled to remove the remaining 2-amino-3-methyl pyridine. A mixture of α- and β-methyl naphthalene was thus obtained containing about 80% of the β-isomer and 20% of the α-isomer.

Although this invention has been described particularly in reference to the separation of α- and β-methyl naphthalene, the same technique of azeotropic distillation described in reference to separation of these two isomers may also be applied in the separation of other close-boiling, difficultly separable isomers.

The pure α- and β-methyl naphthalene isomers obtainable according to the process of the invention have several important commercial uses. For example, the β-isomer may be simply transformed into 2-methyl-1,4-naphthoquinone, a pharmaceutical having antihemorrhagic activity, for example, by direct oxidation with chromic anhydride in acetic acid as a solvent. Similarly, the β-isomer may serve as an intermediate in the preparation of vitamin K. The α-isomer may be readily converted into α-naphthyl acetic acid, an important plant auxin by oxidation of the methyl group. The eutectic mixture of α- and β-naphthalene, containing about 82% of the α-isomer, may be prepared by distillation according to the method of the invention to give a fuel mixture having desirable pour point characteristics for extreme low temperatures.

It is to be understood that the above description and examples are intended merely to be illustrative of the invention, and that the invention is not to be limited thereby, nor in any way except by the scope of the appended claims.

We claim:

1. A method for separating α-methyl naphthalene from β-methyl naphthalene comprising the steps of adding an entrainer comprising undecanol to a mixture containing these isomers, and distilling the resultant mixture at a subatmospheric pressure selected so that said undecanol forms an azeotrope at least with β-methyl naphthalene.

2. A method for separating α-methyl naphthalene from β-methyl naphthalene comprising the steps of adding an entrainer comprising undecanol to a mixture containing these isomers, and distilling the resultant mixture at a reduced pressure between 200 and 300 mm. Hg, whereby undecanol forms a dilute azeotrope with β-methyl naphthalene but virtually no azeotrope with α-methyl naphthalene.

3. A method for separating α-methyl naphthalene from β-methyl naphthalene comprising the steps of adding an entrainer comprising undecanol to a mixture containing these isomers, and distilling the resulting mixture at a reduced pressure between 200 and 300 mm. Hg, whereby undecanol forms a dilute azeotrope with β-methyl naphthalene but virtually no azeotrope with α-methyl naphthalene, removing said dilute azeotrope as overhead distillate until the still residue is virtually depleted of β-methyl naphthalene, concentrating said dilute azeotrope by redistillation at a pressure below 90 mm. Hg whereby a β-methyl naphthalene-rich azeotrope is formed, redistilling said β-methyl naphthalene-rich azeotrope at a pressure above 400 mm. Hg to recover β-methyl naphthalene virtually free from said entrainer.

4. A method for separating α-methyl naphthalene from β-methyl naphthalene comprising the steps of adding to a mixture containing these isomers an entrainer comprising undecanol distilling the resultant mixture at a subatmospheric pressure selected so that said entrainer forms a dilute azeotrope with β-methyl naphthalene but virtually no azeotrope with α-methyl naphthalene, removing an overhead distillate of the dilute azeotrope of entrainer with β-methyl naphthalene until the still residue is virtually depleted of β-methyl naphthalene, redistilling said dilute azeotrope of β-methyl naphthalene with entrainer at a pressure different from that employed in the original distillation to recover said β-methyl naphthalene virtually free from said entrainer, and redistilling said still residue at a pressure different from that employed in the original distillation to recover said α-methyl naphthalene virtually free from said entrainer.

5. A method for separating α-methyl naphthalene from β-methyl naphthalene comprising the steps of adding to a mixture containing these isomers an entrainer comprising undecanol distilling the resultant mixture at a subatmospheric pressure selected so that said entrainer forms a dilute azeotrope with β-methyl naphthalene, but virtually no azeotrope with α-methyl naphthalene, removing an overhead distillate of the dilute azeotrope of entrainer with β-methyl naphthalene whereby the still residue becomes relatively enriched in α-methyl naphthalene, redistilling said dilute azeotrope of entrainer and β-methyl naphthalene at a subatmospheric pressure lower than the pressure employed in the original distillation whereby an azeotrope of entrainer with β-methyl naphthalene is formed relatively richer in β-methyl naphthalene, removing said β-methyl naphthalene-rich azeotrope as overhead distillate while recovering said entrainer virtually free from β-methyl naphthalene as still residue, and redistilling said β-methyl naphthalene-rich azeotrope, at a pressure greater than that employed in the original distillation to recover β-methyl naphthalene virtually free from said entrainer.

JULIAN FELDMAN.
MILTON ORCHIN.

REFERENCES CITED

The following references are of record in the file of this patent:

UNITED STATES PATENTS

| Number | Name | Date |
| --- | --- | --- |
| 2,324,255 | Britton et al. | July 13, 1943 |
| 2,456,561 | Lake et al. | Dec. 14, 1948 |

FOREIGN PATENTS

| Number | Country | Date |
| --- | --- | --- |
| 555,981 | Great Britain | Sept. 15, 1943 |

OTHER REFERENCES

Bureau of Standards Research Paper, R. P. 1289, April 1940.

Chemical Engineering Progress, vol. 44, No. 8, Aug. 1948, pages 627–638, article by Licht et al.

Journal of the Institute of Petroleum Technology, vol. 34, No. 297, Sept. 1948, pages 677–691, article by Morrell et al.

Industrial and Engineering Chemistry, vol. 41, No. 12, Dec. 1949, pages 2897–2900, article by Othmer et al.